United States Patent [19]

Ohkanda

[11] Patent Number: 4,949,826
[45] Date of Patent: Aug. 21, 1990

[54] SPRING CLUTCH

[75] Inventor: Masao Ohkanda, Sagamihara, Japan

[73] Assignee: Kioritz Corporation, Tokyo, Japan

[21] Appl. No.: 391,107

[22] Filed: Aug. 8, 1989

[30] Foreign Application Priority Data

Aug. 12, 1988 [JP] Japan ................... 63-202430

[51] Int. Cl.⁵ .................. F16D 13/08; F16D 43/18
[52] U.S. Cl. ..................... 192/81 C; 192/103 B;
192/105 CE; 192/105 CF
[58] Field of Search .............. 192/26, 33 C, 81 C,
192/103 B, 105 CE, 105 CF

[56] References Cited

U.S. PATENT DOCUMENTS

| | | | |
|---|---|---|---|
| 1,762,799 | 6/1930 | Starkey | 192/81 C X |
| 2,954,109 | 9/1960 | Jardine | 192/105 CF |
| 3,165,184 | 1/1965 | Hebert | 192/105 CF |
| 3,625,326 | 12/1971 | Rix et al. | 192/105 CE |

*Primary Examiner*—Richard Lorence
*Attorney, Agent, or Firm*—Bauer & Schaffer

[57] ABSTRACT

A spring clutch where an input shaft and output shaft are connected and disconnected with each other through a coil spring. The coil spring is secured at one end to the output shaft and is freely disposed over the input shaft at its other end. A centrifugally responsive pawl is mounted to engage the coil spring at the end disposed about the input shaft when said input shaft is rotated at or above a predetermined speed to cause said coil to be wound and tightened about the coil spring, thereby connecting the input and output shaft.

4 Claims, 3 Drawing Sheets

SPRING CLUTCH

FIELD OF THE INVENTION

This invention relates to a spring clutch for small air-cooled two-cycle gasoline engines and the like used as the power source for mowers, hedge trimmers, and chemical sprayers.

The spring clutch of the present invention is different from the known friction type clutch utilizing centrifugal force. It will produce no slip, even at the time of a low speed rotation and therefore will transmit the rotation and torque of the engine directly to the output shaft while the clutch is engaged.

BACKGROUND OF THE INVENTION

The clutches conventionally used have been almost all of the friction type utilizing centrifugal force.

Generally, the aforementioned clutch comprises a clutch boss connected to the engine and a clutch drum arranged concentrically with the clutch boss and rotatable independently of the clutch boss. Interposed between the clutch boss and the clutch drum are a plurality of clutch shoes movable in the radial direction toward the clutch boss and a spring partially pressing the respective clutch shoes inward the radial direction. Thus, when the rotating speed of the clutch boss increases, the clutch shoes will be moved outward in the radial direction against the action of the spring by the centrifugal force applied to them and will be thereby frictionally engaged with the clutch drum to transmit the torque to the clutch drum (for example, see the publication of Japanese Utility Model Application Laid Open No. 81737/1987).

In the above-mentioned conventional clutch operation is normally smooth at the time of starting the transmission of the torque, but during the time of operation in the low speed rotation range, slippage will be produced. Thus, transmitting efficiency will reduce, and the desired low speed rotation and torque transmission will not be obtained.

Further, the above-mentioned conventional clutch is complicated in its structure, requires such various parts as the clutch boss, clutch drum, clutch shoes, and spring, giving rise to difficulty in its manufacture. In addition, the clutch is expensive and cannot be made small and light.

An object of the present invention is to provide a clutch whereby slippage in the low speed rotation is eliminated, and while it is engaged, the rotation and torque of the engine will be transmitted as they are and without loss.

Another object of the present invention is to provide a clutch wherein the shock at the time of starting the transmission of the torque is small.

Further, a third object of the present invention is to provide a clutch which is simple in structure and can be made small and light and can be provided cheaply.

SUMMARY OF THE INVENTION

In the present invention an input shaft (crank shaft) and an output shaft are linearly arranged with a small clearance between them so as to be connected and relased through only one coil spring. That is to say, one coil spring is fitted, spanning the small clearance, to the end parts of the input shaft and output shaft and is secured to the output shaft at the output shaft side end. The coil spring is normally maintained free with respect to the input shaft.

Further, there is provided on the input shaft side a centrifugal pawl rocked by a centrifugal force when the input shaft has reached a predetermined rotation speed. In the present invention, when the input shaft reaches a predetermined rotational speed, the centrifugal pawl will engage the coil spring, and the coil spring will be wound and fastened about the above-mentioned input shaft and output shaft which will be thus connected to transmit the power (rotation) of the input shaft to the output shaft through the coil spring.

When the above-mentioned input shaft is rotated at a speed below the above-mentioned predetermined rotation speed, the centrifugal pawl will be returned by the force of the spring, the engagement of this centrifugal pawl and the coil spring at the input shaft side end will be released, and therefore, the transmission of the power will also be also released.

BRIEF DESCRIPTION OF THE DRAWINGS:

The drawings show an embodiment of the present invention.

DETAILED DESCRIPTION OF THE INVENTION

Figure 4:
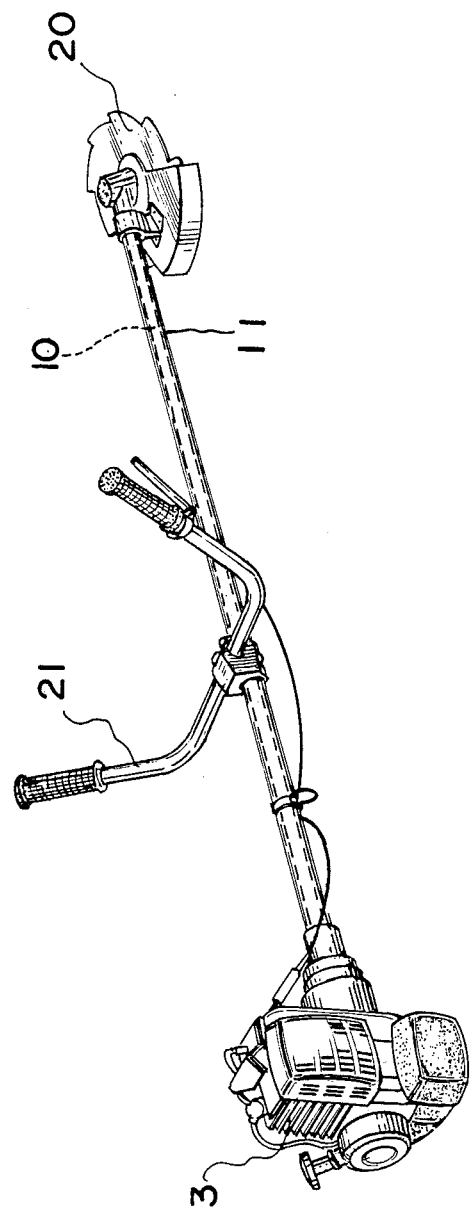
FIG 4 is a perspective view of a mower as an example of a power working machine in which the clutch is employed.

The present invention shall be explained in detail in the following with reference to the illustrated embodiments seen in FIG. 4, wherein the invention is applied to a mower comprising a small air-cooled two-cycle gasoline engine 3 having a power transmitting shaft 10 extending through an operating rod 11 and shaft 10 and operating handle 21.

Figure 1:
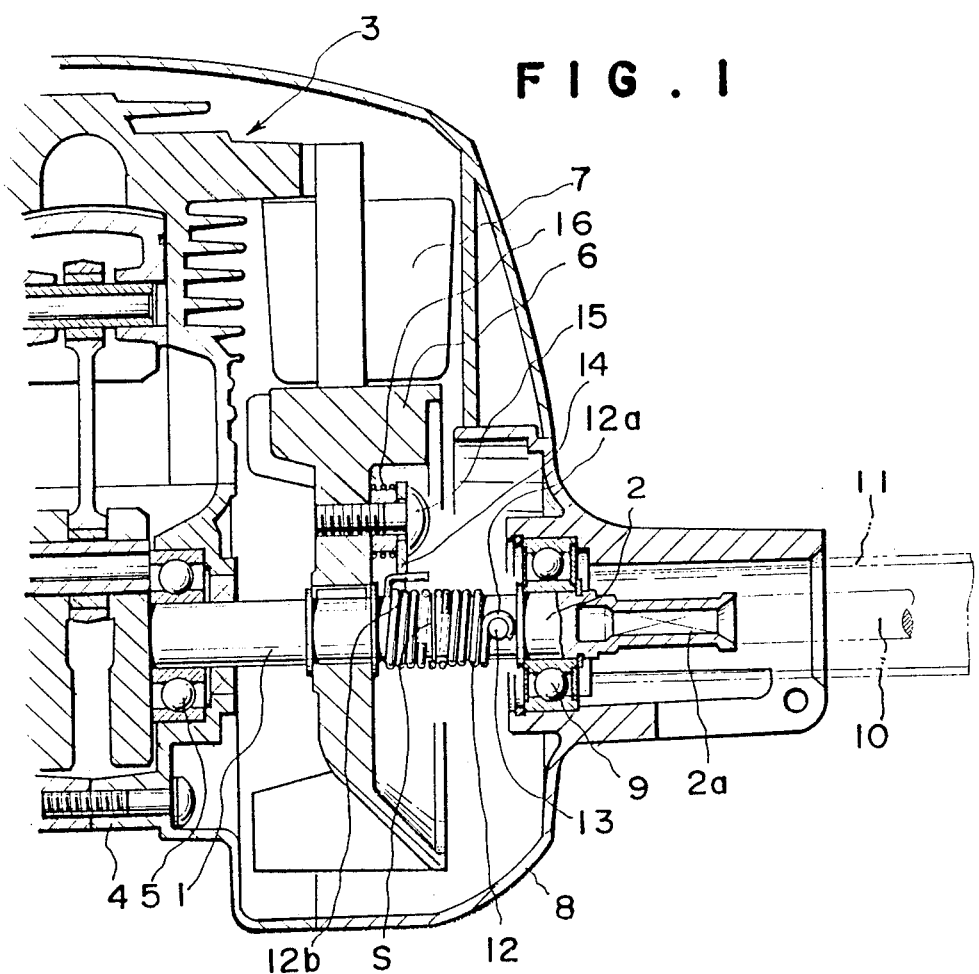
FIG. 1 is a vertically sectioned view of the clutch embodying the present invention.

As seen in FIG. 1 the present invention comprises a clutch input shaft 1 such as the crank shaft of the motor 3 axially aligned with a clutch output shaft 2. The shafts are separated by a small clearance S between them. The input shaft 1 is borne by a bearing 5 provided in the crank case 4 of the engine 3 and has a magnetic rotor 6 secured transversely to the axis of shaft 1 in a proper position near its end. In the drawing, the reference numeral 7 represents an electricity generating coil for ignition apparatus.

The output shaft 2 is also borne by a bearing 9 provided in the motor cover 8 secured integrally with the above-mentioned crank case 4 and has as connecting part 2a to which the power transmitting shaft 10 is fixed and about which the operating rod 11 extends.

A coil spring 12, wound reversely to the rotating direction of the input shaft 1, is loosely fitted about the adjacent ends of the linearly arranged input shaft 1 and output shaft 2 and is secured at its forward end 12a to the output shaft 2. The coil spring 12 is secured to the output shaft by a pin 13 provided in advance by pressing or screwing the pin in the output shaft 2.

The opposite end of the spring 12 is formed with a bent part 12b extending parallel to the input shaft 1 in opposition to a centrifugal pawl 14 pivotally fixed on a pin 15 to the magnetic rotor 6.

Figure 2:
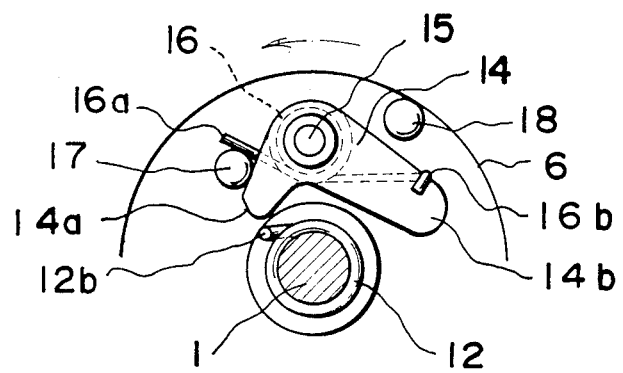
FIG 2 is an elevational view of the centrifugal pawl when no power is being transmitted to the clutch.
Figure 3:
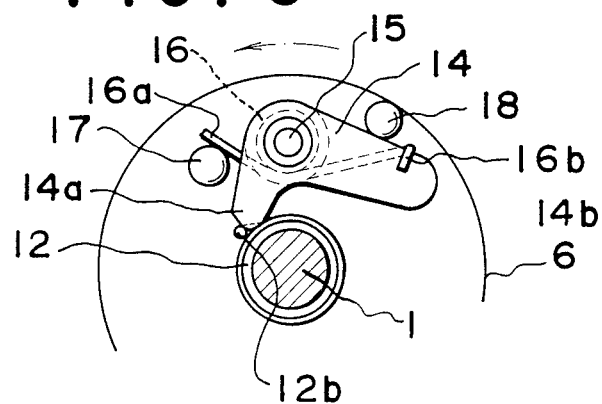
FIG 3 is a similar view, showing the centrifugal pawl when power is being transmitted to the clutch.

As seen in FIGS. 2 and 3 the tip 14a of the paw 14 engages with the bent part 12b of the coil spring 12 so as to be able wind and tighten the coil spring 12 on the input shaft 1 and output shaft 2 when the input shaft 1 is rotated above a predetermined rotational speed but will remain free from such engagement when the input shaft 1 is rotating below the predetermined rotational speed.

By the way, the above-mentioned "when below a predetermined rotational speed " includes not only when idling but also when the engine 3 stops.

The above-mentioned centrifugal paw 14 is substantially L-shaped as a whole having a short arm on which the tip 14a is located and a long arm having a tip 14b so that, at the time of the predetermined rotation speed, the arm having tip 14b moving outward radially by the centrifugal force. The pivot pin 15 on which the pawl 14 is journaled is provided with a wing spring 16. As seen in FIGS. 2 and 3 the spring 16 engages a stop 17 at one end 16a and is secured at the other end 16b to the rear end of the arm having the tip 14b. In this manner the pawl 14 is biased to be normally in engagement with stop 17 and away from contact with the end 12b of the coil spring 12 as seen in FIG. 2.

A seconod stop 18 is proveded at the peripheral edge of the magnetic rotor 6 on the side of the pawl end 14b. At the time when the input shaft 1 or the magnetic rotor 6 are rotating at or above the predetermined speed, the centrifugal paw 14 will be moved so that the tip 14b overcomes the force of the spring 16 and moves to engage with the stop 18, thus controlling any further unnecessary movement caused by increasing the centrifugal force (FIG. 3).

In the present invention, for example, when the engine 3 is below the predetermined rotational speed, as shown in FIG. 2, the tip 14a of the centrifugal paw is maintained away from the bent part 12b of the coil spring 12. Even when the input shaft 1 and magnetic rotor 6 are first rotated, the input shaft will idle within the coil spring 12, and no rotation will be transmitted to the output shaft side.

Thereafter, when the number of revolutions of the engine 3 is increased until the input shaft 1 and magnetic rotor 6 are above the predetermined rotational speed, the centrifugal paw 14 will move radially outward so that the tip 14b is forced outwardly by the centrifugal force, causing the tip 14a to move inwardly toward the input shaft 1 to engage with the bent part 12b of the coil spring 12 as shown in FIG. 3. The spring 12 will consequently be gradually wound and tightened about the input shaft 1 and output shaft 2, establishing a connection between each shaft so that the torque of the input shaft 1 will be transmitted as it is to the output shaft 2.

As mentioned above, in the present invention the spring clutch does not normally frictionally engage the input shaft as in the conventional clutch; therefore, there is no space for producing slippage. Even if the rotational speed of the motor is adjusted, the engagement of the clutch remains steady once the bias of the spring 16 is overcome, and the rotation and torque of the engine will be transmitted directly to the output shaft. As the coil spring 12 is gradually wound and fastened as mentioned above, shock even at the time of the starting the power transmission will be well absorbed.

Further, the number of component parts is few, and the product is easy to make. It can be provided cheaply and can be made small and light.

What is claimed is:

1. A clutch comprising a rotatable input shaft and output shaft coaxially aligned and having adjacent end axially spaced from each other by a small clearance, a coil spring disposed over the adjacent ends of said input and output shafts, a first end of said coil being secured to said output shaft, and a second end of said coil being freely disposed over said input shaft, a rotor mounted on said input shaft for conjoint rotation therewith, a rockable paw mounted on said rotor and having an arm resiliently biased into a first position out of contact with the second end of said coil and movable into a second position engaging the second end of said coil in response to centrifugal force created by rotation of said input shaft stop means mounted on said rotor to limit the movement of said pawl upon said input shaft attaining said predetermined speed, said pawl when in engagement with the second end of said coil causing said coil to wind and tighten about said input shaft to thereby couple said input and output shafts.

2. The clutch according to claim 1 wherein the second end of the coil terminates in a tip bent to extend axially along the input shaft.

3. The clutch according to claim 1 wherein said rotor is magnetic and is surrounded by an electric generating coil.

4. The clutch according to claim 1 wherein said pawl is L-shaped and mounted on a pivot pin at its center, said pawl being biased by spring means wound about said pivot pin and having one end engaged over another arm of said pawl and another end engaging another stop disposed on said rotor.

* * * * *

UNITED STATES PATENT AND TRADEMARK OFFICE
CERTIFICATE OF CORRECTION

PATENT NO. : 4,949,826
DATED : August 21, 1990
INVENTOR(S) : Masao Ohkanda

It is certified that error appears in the above-identified patent and that said Letters Patent is hereby corrected as shown below:

Claim 1, line 27 "paw" should be --pawl-- line 32 before "stop" insert --above a predetermined speed, and--

Signed and Sealed this

Seventh Day of January, 1992

*Attest:*

HARRY F. MANBECK, JR.

*Attesting Officer*     *Commissioner of Patents and Trademarks*